United States Patent
Yamazaki

(10) Patent No.: US 12,022,037 B2
(45) Date of Patent: Jun. 25, 2024

(54) STORAGE MEDIUM AND INFORMATION PROCESSING APPARATUS

(71) Applicant: CANON KABUSHIKI KAISHA, Tokyo (JP)

(72) Inventor: Shinya Yamazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/845,733

(22) Filed: Jun. 21, 2022

(65) Prior Publication Data

US 2022/0417373 A1 Dec. 29, 2022

(30) Foreign Application Priority Data

Jun. 24, 2021 (JP) ................. 2021-104934

(51) Int. Cl.
*H04N 1/00* (2006.01)
*G06F 3/12* (2006.01)

(52) U.S. Cl.
CPC ......... *H04N 1/00477* (2013.01); *G06F 3/121* (2013.01); *G06F 3/1259* (2013.01); *H04N 1/00488* (2013.01); *H04N 1/00* (2013.01)

(58) Field of Classification Search
None
See application file for complete search history.

(56) References Cited

U.S. PATENT DOCUMENTS

| 11,706,359 B2 * | 7/2023 | Maeda ................. G06F 3/1259 358/1.13 |
| 2019/0384538 A1 * | 12/2019 | Suzaki ................. G06F 3/1259 |
| 2021/0373826 A1 * | 12/2021 | Sueshige ............... G06F 3/1288 |
| 2022/0417373 A1 * | 12/2022 | Yamazaki ........... H04N 1/00488 |

FOREIGN PATENT DOCUMENTS

JP 2019164736 A 9/2019

* cited by examiner

*Primary Examiner* — Darryl V Dottin
(74) *Attorney, Agent, or Firm* — Canon U.S.A., Inc. I.P. Division

(57) ABSTRACT

A method for an information processing apparatus, the method including firstly acquiring information regarding a communication apparatus configured to communicate with the information processing apparatus, secondly acquiring notification information created by a management server configured to communicate with the information processing apparatus, executing a first determination process for determining whether the acquired information regarding the communication apparatus satisfies an output condition corresponding to information included in the acquired notification information, and in response to determining in the first determination process that the information regarding the communication apparatus satisfies the output condition, outputting a notification based on the notification information.

16 Claims, 19 Drawing Sheets

FIG. 5

```
{
 "message" : "Ink discount campaign is underway!",
 "campaignURL" : "https://www.hegehogexxx.com/canpaign/index.html",
 "expireDate" : "2020/12/01 0:00",
 "devices" : {
  "12345678",
  "11223344",
  "88776655",
      :
 }
 "condition" : "Warning:InkLow"
}
```

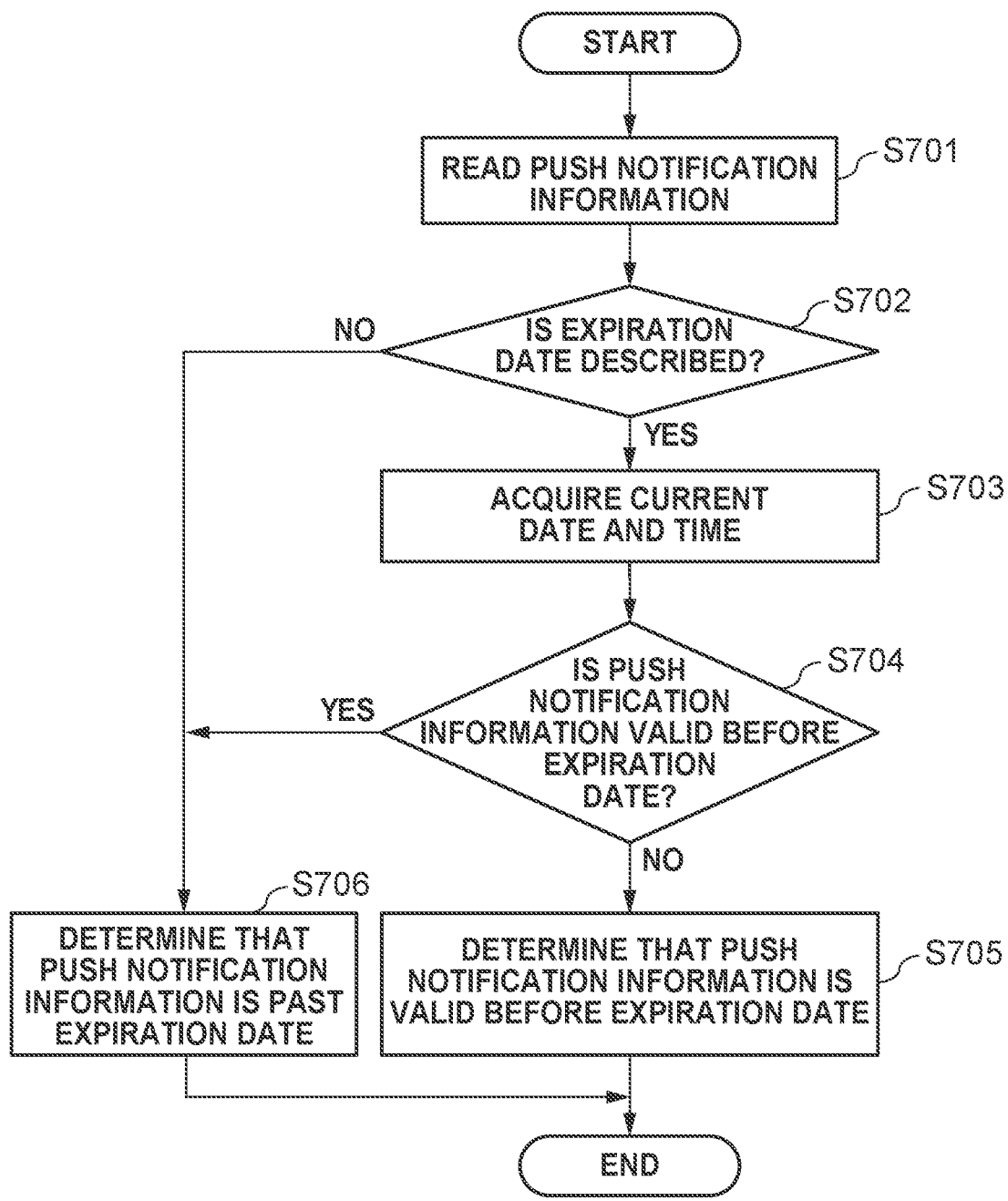

FIG. 8

| Status | Detailed Status | Value |
|---|---|---|
| Waiting | Warning Indicating Small Remaining Amount of Ink | Idle:InkLow |
| | Warning Indicating Small Remaining Number of Sheets | Idle:PaperLow |
| Printing | Alert Indicating Small Remaining Amount of Ink | Printing:InkLow |
| | Alert Indicating Small Remaining Number of Sheets | Printing:PaperLow |
| Changing Ink | | InkChange |
| Error | Opening of Main Body Cover | Error:CoverOpen |
| | Battery Breakdown Error | Error:BatteryErr |

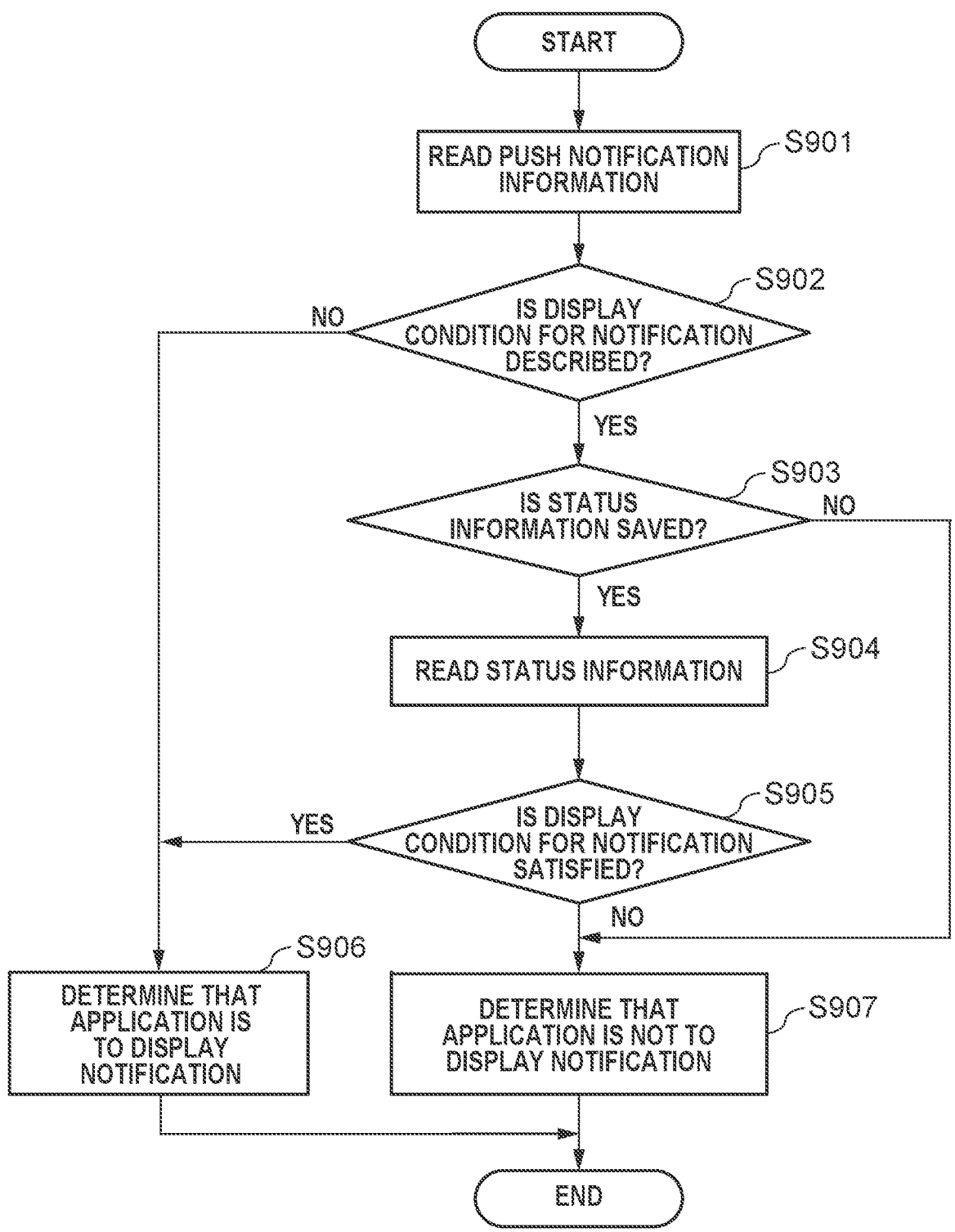

FIG. 13A

| No. | Push Notification Information | Distribution Date |
|---|---|---|
| 1 | Push Notification Information_1 | 2020/10/01 10:00 |
| 2 | Push Notification Information_2 | 2020/11/01 11:00 |
| 3 | Push Notification Information_3 | 2020/12/01 12:00 |
| 4 | Push Notification Information_4 | 2020/12/25 10:00 |

FIG. 13B

| No. | Push Notification Information | Distribution Date | Notification Priority |
|---|---|---|---|
| 1 | Push Notification Information_2 | 2020/11/01 11:00 | High |
| 2 | Push Notification Information_3 | 2020/12/01 12:00 | High |
| 3 | Push Notification Information_1 | 2020/10/01 10:00 | Medium |
| 4 | Push Notification Information_4 | 2020/12/25 10:00 | Low |

FIG. 14

| Message: | Ink discount campaign is underway! |
|---|---|
| Display URL: | https://www.hegehogexxx.com/canpaing/index.html |
| Expiration Date of Notification: | December 1, 2020, 0:00 |
| Distribution Target Model of Notification: | ☑ AAA Printer<br>☑ BBB Printer<br>☐ CCC Printer<br>☐ DDD Printer |
| Display Condition for Notification: | Occurrence of warning indicating small remaining amount of ink |
| Priority of Notification: | High |

1401

Register

FIG. 16
FIG. 16A
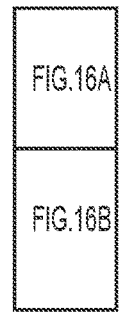
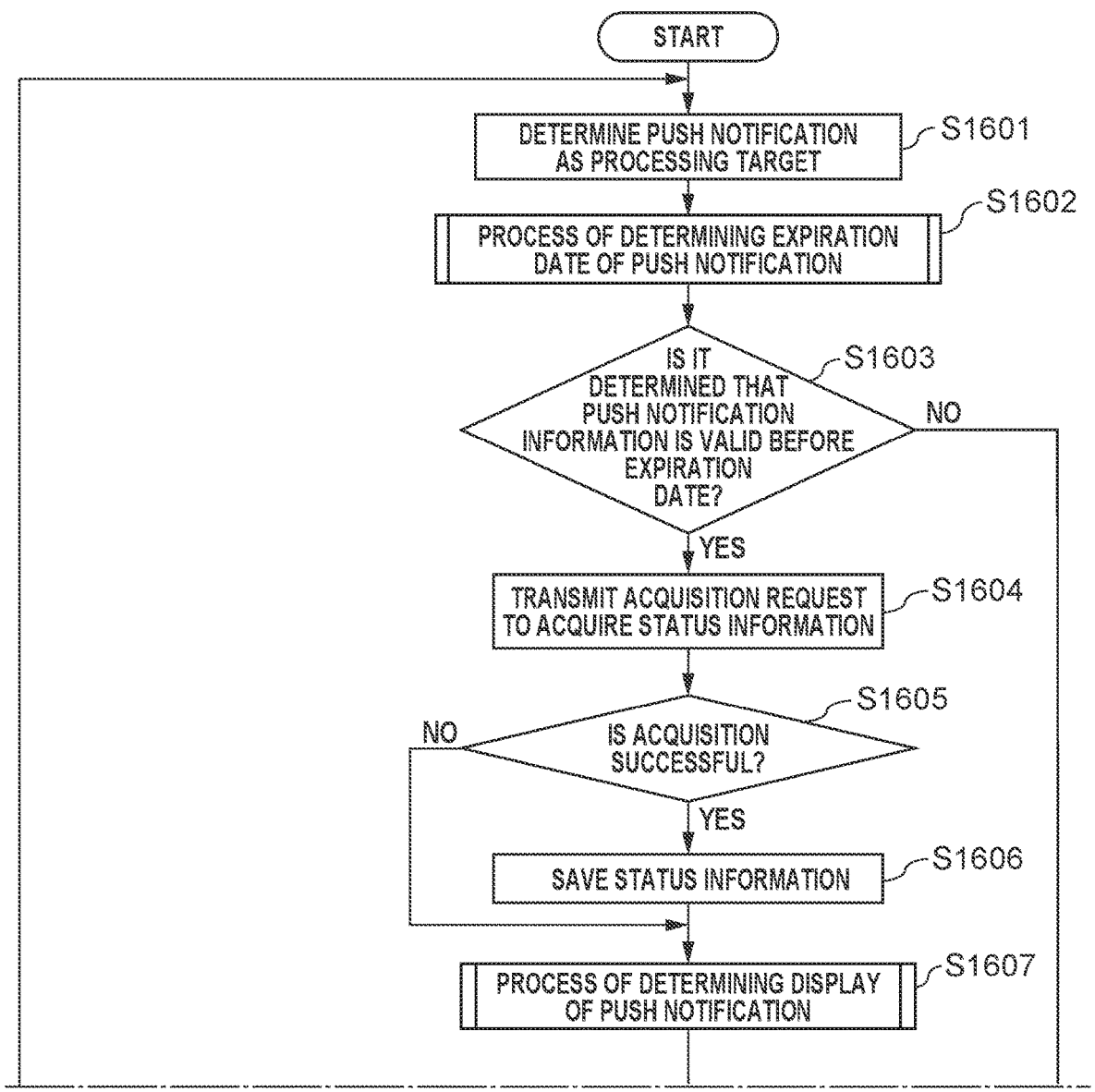

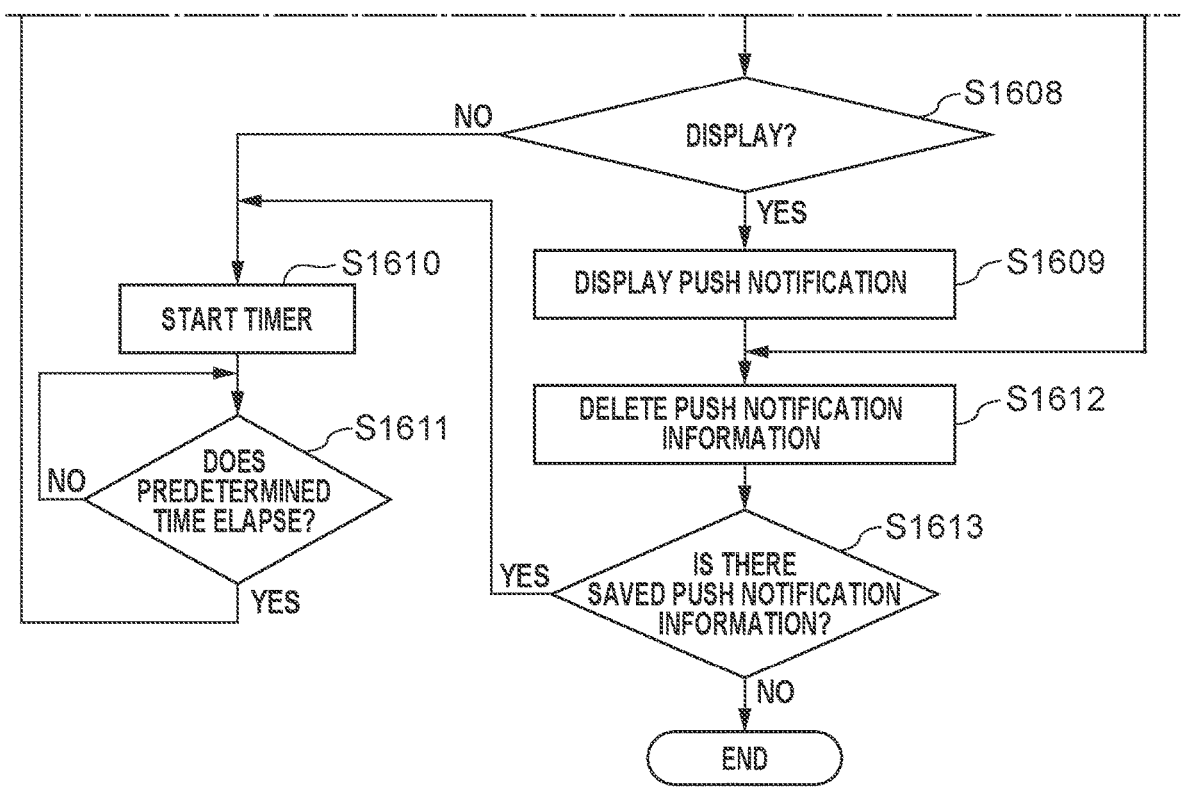

STORAGE MEDIUM AND INFORMATION PROCESSING APPARATUS

BACKGROUND

Field

The present disclosure relates to storage media and information processing apparatus.

Description of the Related Art

There is known a technique for notifying a terminal apparatus of information at an appropriate timing to provide the information to a user. For example, Japanese Patent Application Laid-Open No. 2019-164736 discusses a technique for determining a timing when a user is notified of appropriate information based on a learning model trained on timings when the user is notified of information for a particular action of a user.

However, for example, the method of determining the timing discussed in Japanese Patent Application Laid-Open No. 2019-164736 sometimes does not provide notifications at appropriate timings for users depending on the state of the communication apparatus related to the notification information.

SUMMARY

In view of the above issue, the present disclosure provides techniques and mechanisms for notification of a terminal apparatus of information at appropriate timings for users.

According to various embodiments of the present disclosure, a method is provided that includes firstly acquiring information regarding a communication apparatus configured to communicate with the information processing apparatus, secondly acquiring notification information created by a management server configured to communicate with the information processing apparatus, executing a first determination process for determining whether the acquired information regarding the communication apparatus satisfies an output condition corresponding to information included in the acquired notification information, and in response to determining in the first determination process that the information regarding the communication apparatus satisfies the output condition, outputting a notification based on the notification information.

Further features of the present disclosure will become apparent from the following description of example embodiments with reference to the attached drawings.

BRIEF DESCRIPTION OF THE DRAWINGS

FIG. 5 illustrates information regarding a push notification according to one embodiment.

FIG. 7 illustrates a flowchart of a process of determining an expiration date of the notification based on the push notification information according to one embodiment.

FIG. 8 illustrates status information and error/warning information regarding a printer according to one embodiment.

FIG. 9 illustrates a flowchart of a process of determining display of the notification based on the push notification information according to one embodiment.

FIGS. 13A and 13B illustrate saved pieces of push notification information according to one embodiment.

FIG. 14 illustrates a screen for setting push notification information according to one embodiment.

FIGS. 16A and 16B are a flowchart illustrating a process of displaying the notification based on the push notification information according to one embodiment.

DESCRIPTION OF THE EMBODIMENTS

Some example embodiments of the present disclosure will be described in detail with reference to the drawings below. The following example embodiments do not limit the present invention according to the appended claims, and not all the combinations of the features described in the present example embodiments are used in methods for solving the issues in the present disclosure. Like numbers refer to like components or similar components, and redundant description will be omitted.

Figure 1:
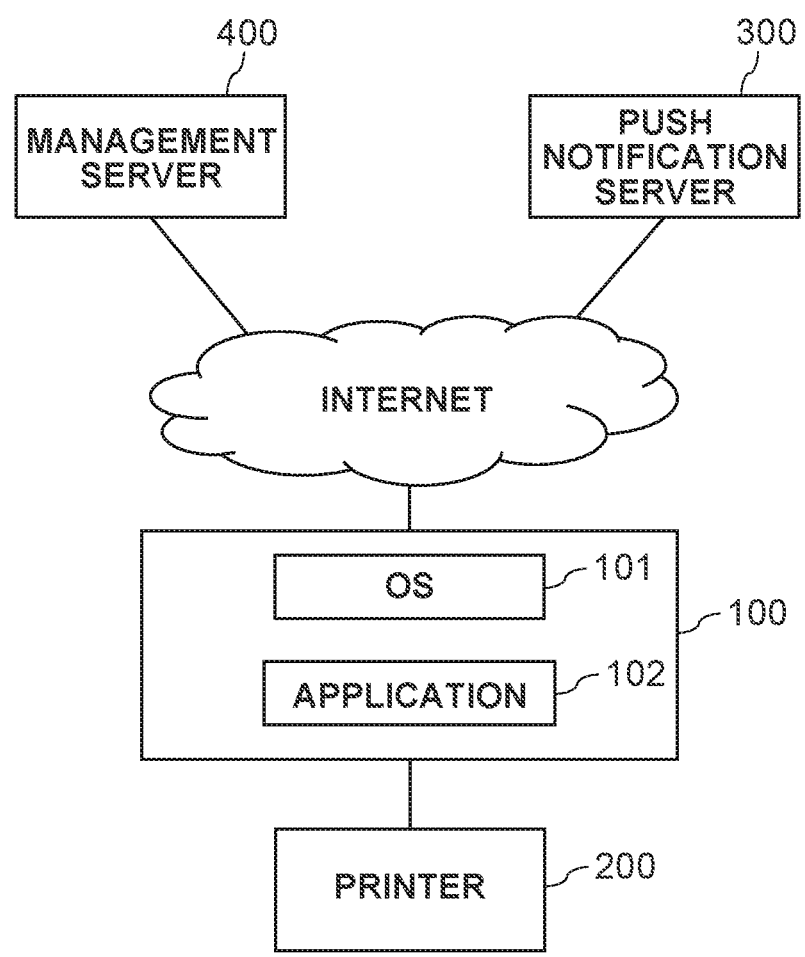
FIG. 1 illustrates a configuration of a system according to one embodiment.

A first example embodiment will be described. FIG. 1 is a diagram illustrating the configuration of a system according to the present example embodiment. The system according to the present example embodiment includes a terminal apparatus 100, a printing apparatus (hereinafter, "printer") 200, a push notification server 300, and a management server 400. The terminal apparatus 100 is an information processing apparatus on which an operating system (hereinafter, "OS") 101 and an application 102 are installed.

In the system illustrated in FIG. 1, the apparatuses are connected to communicate with one another. For example, communication methods used in connecting the terminal apparatus 100 and the printer 200 to each other uses communications standards (Wi-Fi) of the Institute of Electrical and Electronics Engineers (IEEE) 802.11 series or Bluetooth® (Bluetooth® Classic or Bluetooth® Low Energy (BLE)). In some embodiments, the terminal apparatus 100 and the printer 200 are connected to each other via a Universal Serial Bus (USB) cable. A form may be employed in which the terminal apparatus 100 and the printer 200 are not directly connected to each other. In some embodiments, specifically, for example, the terminal apparatus 100 and the printer 200 is connected to each other via a network composed of access points. In other embodiments, the terminal apparatus 100 and the printer 200 connect to a base station through mobile communication (3G, 4G, or 5G) to communicate with each other through internet communications via the base station. The terminal apparatus 100 is connected to the push notification server 300 and the management server 400 so that the terminal apparatus 100 can communicate with the push notification server 300 and the management server 400 via the Internet. Further, the management server 400 and the push notification server 300 are connected to communicate with each other via the Internet.

The terminal apparatus 100 is an information processing apparatus such as a personal computer (PC) or a smartphone. Various types of devices such as a digital camera may also be used as the terminal apparatus 100 according to the present example embodiment. The printer 200 used in the present example embodiment performs printing through an electrophotographic method, an inkjet method, or another method.

The management server 400 is an information processing apparatus provided with a function of creating push notification information and managing which terminal apparatus push notification information is to be transmitted to. The details will be described below with reference to FIG. 3.

The push notification server 300 is an information processing apparatus provided with a function of distributing push notification information to the terminal apparatus 100. The details will be described below with reference to FIG. 3.

Figure 2:
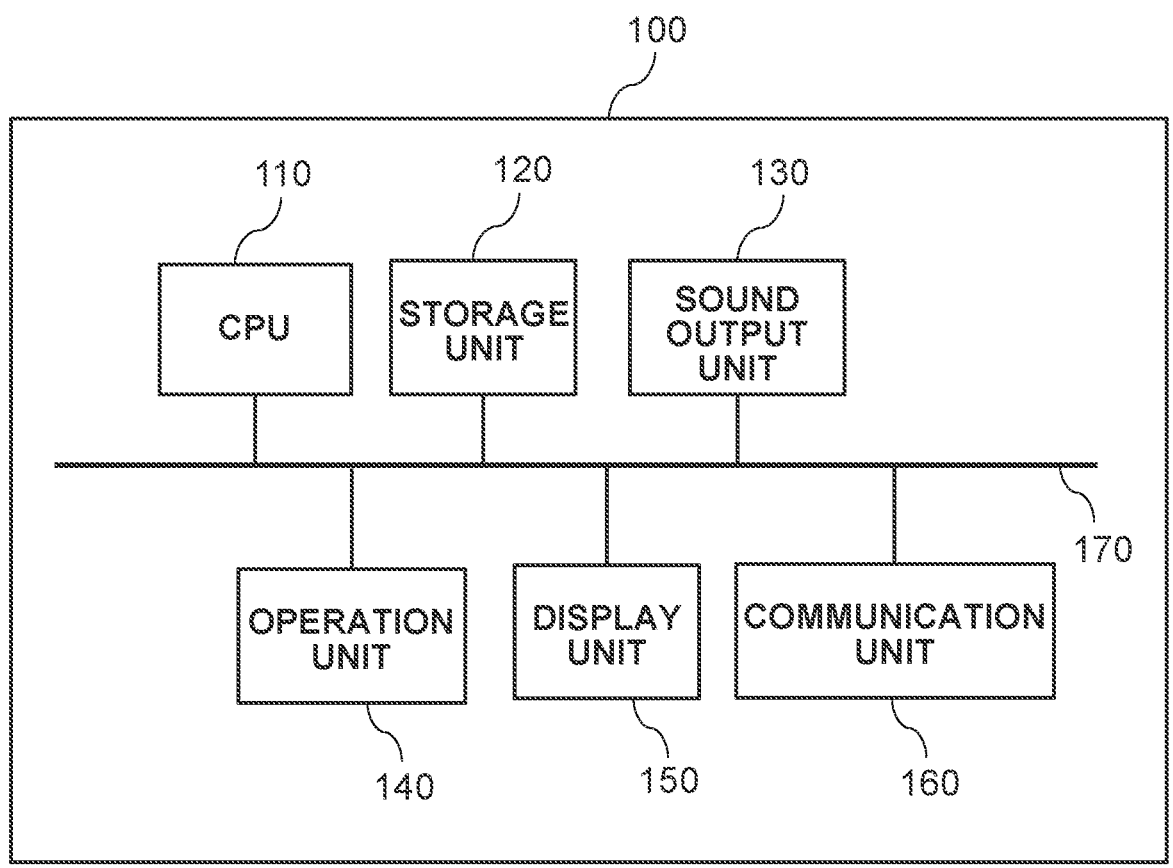
FIG. 2 illustrates a hardware configuration of a terminal apparatus according to one embodiment.

FIG. 2 is a diagram illustrating a hardware configuration of the terminal apparatus 100. The terminal apparatus 100 includes a central processing unit (CPU) 110, a storage unit 120, a sound output unit 130, an operation unit 140, a display unit 150, and a communication unit 160. These components are connected to one another via a system bus 170.

The operation unit 140 receives user operations. The operation unit 140 is composed of a mouse, a keyboard, and a touch panel by way of example. The sound output unit 130 outputs sound. For example, the sound output unit 130 includes a loudspeaker and outputs the content of push notification information with sound. The display unit 150 displays images and information. For example, the display unit 150 includes a screen such as a liquid crystal display and displays the content of push notification information on the screen as outputs. The communication unit 160 communicates with another apparatus. For example, the communication unit 160 includes a USB interface, a wired local area network (LAN) interface, and a wireless LAN interface and communicates with the printer 200, the push notification server 300, and the management server 400. The storage unit 120 includes a read-only memory (ROM) and a random-access memory (RAM) by way of example. The storage unit 120 stores various types of data and various programs and is used as a work area for running the various programs or a temporary storage area for data. Examples of the programs stored in the storage unit 120 include the OS 101 and the application 102. The following description is given using an application for controlling the printer 200 as an example of the application 102. In the storage unit 120, software other than the OS 101 and the application 102 may be stored. For example, a drawing application for generating image data and a printer driver for generating print data based on generated image data (print data generation software) are storable.

The hardware configurations of the management server 400 and the push notification server 300 according to the present example embodiment are similar to the configuration illustrated in FIG. 2. An example will be described where the management server 400 and the push notification server 300 according to the present example embodiment each is a single server apparatus (information processing apparatus). However, a configuration may be employed in which a function carried out by each server is implemented by a plurality of servers on a cloud cooperatively operating with one another. In other words, the management server 400 and the push notification server 300 each may be composed of a plurality of server apparatuses. A server composed of a single server apparatus or a plurality of server apparatuses is referred to also as a "server system".

A push notification will be described. The push notification server 300 notifies the terminal apparatus 100 of information regarding services or campaigns related to the application 102 operating on the terminal apparatus 100 (that function is referred to as a "push notification function"). However, a notification based on notification information distributed by the push notification function (hereinafter, "push notification information") is displayed on the screen of the terminal apparatus 100 for a certain period immediately after the push notification information is received. Thus, if the user does not perform the operation of clicking this push notification, the push notification is often deleted.

Thus, it is appropriate to display the push notification at the timing when the user wishes a push notification. For example, to distribute campaign information regarding a consumable product used in the printer 200 connected to the terminal apparatus 100 as a push notification, it is appropriate to display a push notification at the timing when the remaining amount of the consumable product becomes small.

In response, in the present example embodiment, with a display condition specified for push notification information, the display condition being satisfied by a communication apparatus such as the printer 200 connected to the terminal apparatus 100, a notification based on the push notification information is displayed on the screen of the terminal apparatus 100. Consequently, at the timing when the user wishes a push notification, the push notification is displayed. The push notification information according to the present example embodiment is received as push notification information from the push notification server 300 by the terminal apparatus 100 and then saved in the storage unit 120 of the terminal apparatus 100. Then, the application 102 reads the saved information and gives a notification. Thus, in a strict sense, that notification is different from a push notification displayed immediately after push notification information is received by the OS 101, but is described as a push notification for convenience.

Figure 3:
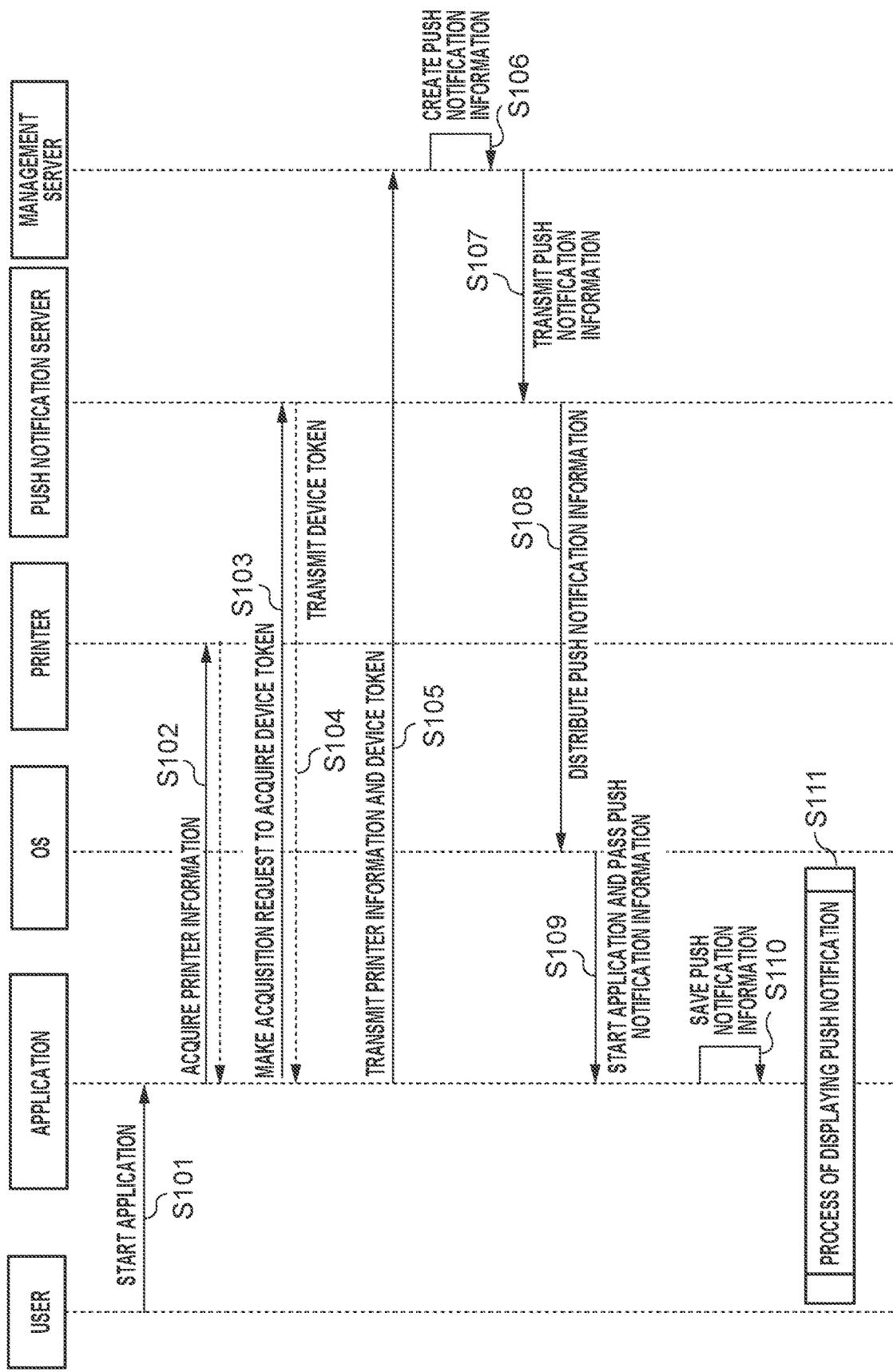
FIG. 3 illustrates a sequence of the system according to one embodiment.

FIG. 3 illustrates a sequence of this system. In the following description, each apparatus, the application, and the OS may perform each process, but actually, a corresponding function is carried out by a processor such as the CPU in each apparatus running a corresponding program. Not all the processing is sequentially performed in a single process, and there can also be a case where the processing is transferred to the OS once and called by the OS again. This is a mere procedure simply illustrating the main processing for convenience.

In step S101, the application 102 is started by the user.

In step S102, the application 102 acquires printer information from the printer 200. The "printer information" refers to attribute information and identification information regarding the printer 200, such as the model name and the serial number of the printer 200. If a plurality of printers 200 is connected to the terminal apparatus 100, the application 102 may acquire pieces of printer information regarding all the printers 200 connected to the terminal apparatus 100.

In step S103, the application 102 makes an acquisition request to acquire a device token to the push notification server 300. The "device token" refers to identification (ID) for identifying a terminal apparatus as a target for the push notification server 300 to transmit push notification information. The terminal apparatus 100 is a terminal apparatus as a target for a push notification to be transmitted. If the push notification server 300 receives the acquisition request to acquire a device token from the application 102, the push notification server 300 creates a device token corresponding to the terminal apparatus as the target.

The application 102 knows address information regarding the push notification server 300 in advance and can communicate with the push notification server 300.

In step S104, the push notification server 300 transmits the created device token to the application 102.

In step S105, the application 102 transmits the printer information acquired in step S102 and the device token acquired in step S104 in association with each other to the management server 400. If a plurality of pieces of printer information is acquired in step S102, the application 102 allows the user to select a printer 200 to be used from among printers 200 corresponding to the acquired pieces of printer information. For example, the application 102 displays a selection screen for the user to select the printer 200 to be used. Then, the application 102 transmits the printer information regarding the selected printer 200 and the device token acquired in step S104 in association with each other to the management server 400. The application 102 knows address information regarding the management server 400 in advance.

In step S106, the management server 400 acquires push notification information. The settings of the push notification information are created on a dashboard provided by the management server 400. The "dashboard" refers to a management screen for a service provider such as a vendor to set what push notification information is to be distributed to which terminal apparatus. The push notification information can be set on a user interface (UI) screen provided by the management server 400. For example, the service provider such as a vendor sets the push notification information using a screen illustrated in FIG. 4. These settings may be made in advance by the service provider, or may be made at the timing when the service provider wishes to transmit a push notification. If the settings are made in advance, it is desirable that the settings includes a timing when the management server 400 transmits a push notification (the clock time or a condition). Then, based on the printer information acquired in step S105 and at the timing set in advance (or the timing newly set by the service provider for push notifications), the management server 400 generates (acquires) corresponding push notification information. The details of the generated push notification information will be described below with reference to FIG. 5.

In step S107, the management server 400 transmits the push notification information to the push notification server 300. Further, the management server 400 also transmits the device token transmitted from the application 102 to the push notification server 300.

In step S108, the push notification server 300 determines to distribute the push notification information to the terminal apparatus corresponding to the device token transmitted from the application 102. In this case, the terminal apparatus is the terminal apparatus 100. Then, the push notification server 300 distributes the push notification information to the OS 101 installed on the terminal apparatus 100.

In step S109, based on the reception of the push notification information, the OS 101 starts the application 102. Then, the OS 101 passes the received push notification information to the application 102. The application 102 is started in the background, and is not displayed on the screen at that time. It is suitable for the management server 400 to include a particular tag in the push notification information and cause the OS 101 to reference the particular tag.

That is, based on the particular tag, the OS 101 may switch whether the OS 101 is to display (immediately display) a push notification or pass the push notification to the application 102 as in step S109.

Specifically, if the particular tag is included in the push notification information, then in step S109, the OS 101 passes the push notification information to the application 102. If, on the other hand, the particular tag is not included (or a tag different from the particular tag is included) in the push notification information, the OS 101 may instantly give (immediately display) a notification based on the received push notification information. The following description is given using as an example a case where the particular tag is included in the push notification information.

In step S110, the application 102 saves the push notification information passed from the OS 101 in the storage unit 120.

In step S111, the application 102 carries out the process of displaying the notification based on the push notification information, which will be described below with reference to FIG. 6.

Figure 4:
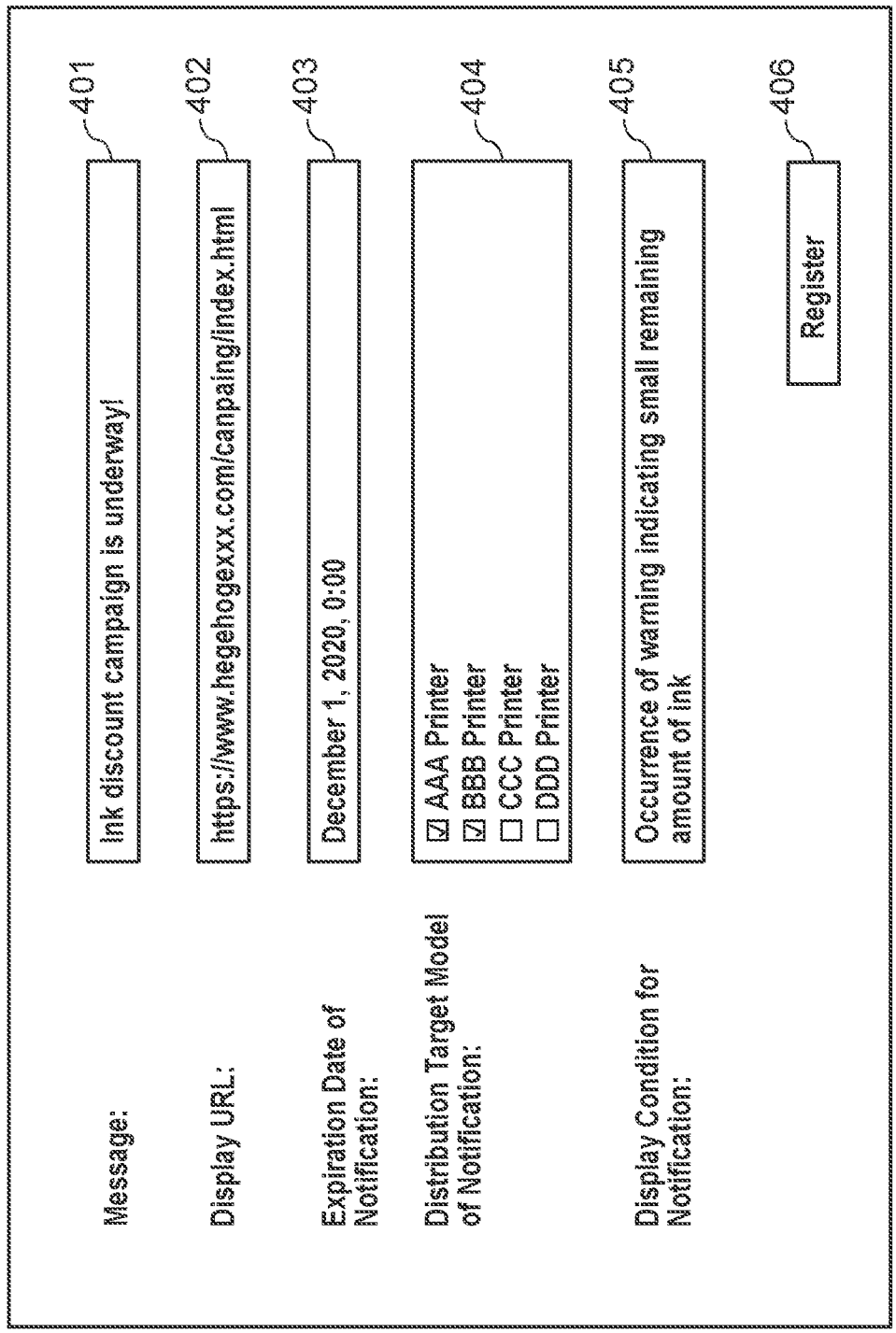
FIG. 4 illustrates a screen for setting push notification information according to one embodiment.

The settings of the push notification information and the push notification information will be described. FIG. 4 illustrates a screen for setting the push notification information. The screen illustrated in FIG. 4 is provided by the management server 400. The service provider sets the push notification information, determining what push notification information is to be distributed to which terminal apparatus. For example, a setting item 401 is an item for setting wording to be displayed on the screen of a terminal apparatus when the push notification information is distributed. In this case, as an example, the wording "Ink discount campaign is underway!" is set. A setting item 402 is an item for setting the Uniform Resource Locator (URL) of a web page to be displayed on a browser when the user selects the displayed push notification information. In this case, as an example, the URL "https://www.hogehogexxx.com/campaign/index.html" is set. For example, the user selects the displayed push notification information and thereby can obtain detailed information related to the content of the push notification information on a web page opened at the corresponding URL. A setting item 403 is an item for determining the expiration date of the display of the push notification information on the terminal apparatus. In this case, as an example, "Dec. 1, 2020, 0:00" is set.

A setting item 404 is an item for setting a printer to distribute the push notification information. In the setting item 404, the names of printers selected in advance as candidates for a distribution target of the push notification information are described. The service provider such as a vendor checks the names of printers related to the content of the push notification information. For example, the service provider checks the names of printers that use the ink corresponding to the ink discount campaign indicated by the item 401. The management server 400 determines whether the name of the printer 200 described in the printer information transmitted in step S105 is included in a list of the names of the printers checked in the setting item 404. Then, if it is determined that the name of the printer 200 is included, the management server 400 extracts the terminal apparatus identified by the device token associated with the transmitted printer information as a terminal apparatus as a distribution target of the push notification information. In this case, as an example, "AAA Printer" and "BBB Printer" are checked. That is, all terminal apparatuses connected to "AAA Printer" or "BBB Printer" are extracted as terminal apparatuses as distribution targets of the push notification information. In this case, a terminal apparatus extracted as one of the terminal apparatuses as the distribution targets of the push notification information is the terminal apparatus 100.

A setting item 405 is an item for setting a display condition for the push notification information. If the state of the printer 200 connected to the terminal apparatus 100 satisfies a condition described in the setting item 405, the push notification information saved in the storage unit 120 is displayed on the screen of the terminal apparatus 100.

In this case, as an example, "Occurrence of warning indicating small remaining amount of ink" is set. That is, it is indicated that under the condition that the remaining amount of ink used in the printer 200 becomes small, the push notification information is displayed on the screen of the terminal apparatus 100. It is also possible not to set the setting item 405. If the setting item 405 is not set, the push notification information is displayed on the screen of the terminal apparatus 100 regardless of the state of the printer 200. The details will be described below with reference to FIG. 9. A button 406 is a registration button for registering the set items 401 to 405. If the registration button 406 is pressed, the push notification information including the set items is saved in the management server 400.

FIG. 5 illustrates information regarding the push notification, an example of a command regarding the push notification information created by the management server 400 based on the content set by the service provider such as a vendor in FIG. 4. In this case, as an example, the command is described in a JavaScript Object Notation (JSON) format. In some embodiments, for example, the command is described in Extensible Markup Language (XML) as a format requested by the push notification server 300. In a "message" key, the wording of the push notification information set in the setting item 401 is set. In "campaignURL", the URL set in the setting item 402 is set. In "expireDate", the expiration date set in the setting item 403 is set. In "devices", device tokens extracted in association with the names of the printers checked in the setting item 404 are set. Although omitted in FIG. 5, device tokens corresponding to all the terminal apparatuses to which the printers checked in the setting item 404 are connected are set. In "condition", the display condition set in the setting item 405 is set. In this case, "Warning:InkLow" indicating "occurrence of warning indicating small remaining amount of ink" is set.

Figure 6:
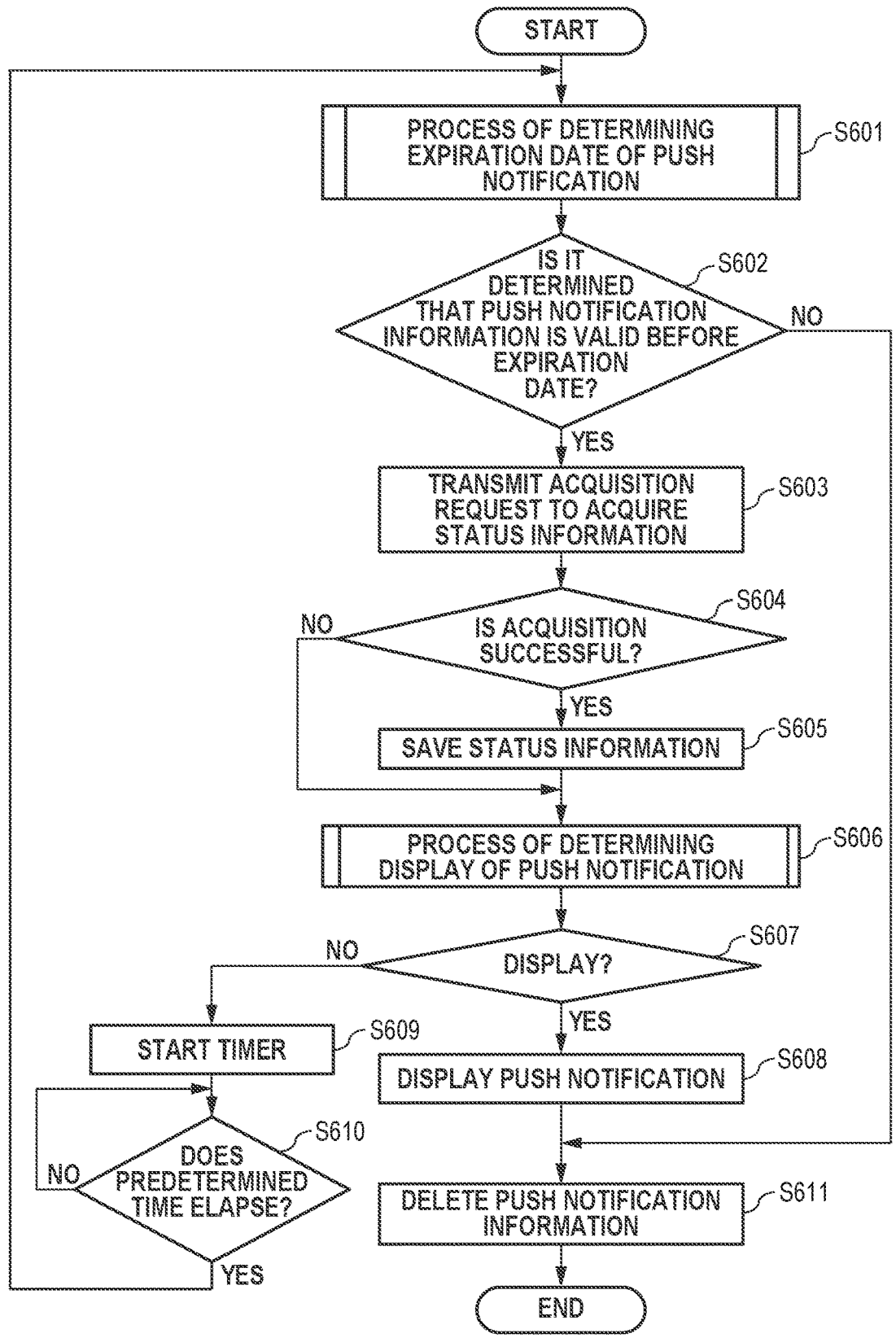
FIG. 6 illustrates a flowchart of a process of displaying the notification based on the push notification information according to one embodiment.

FIG. 6 is a flowchart illustrating the process of displaying the notification based on the push notification information that corresponds to step S111 in FIG. 3. In the following description, the application 102 may perform each process, but actually, a corresponding function is carried out by a processor such as the CPU 110 in the terminal apparatus 100 running a corresponding program. Not all the processing is sequentially performed in a single process, and there can also be a case where the processing is transferred to the OS once and called by the OS again. This is a mere procedure simply illustrating the main processing for convenience. If the push notification information is saved in the storage unit 120 in step S110 in FIG. 3, then in step S111, the application 102 starts the process of displaying the notification based on the push notification information in FIG. 6 that corresponds to step S111.

In step S601, the application 102 carries out the process of determining the expiration date of the notification based on the push notification information. The details will be described below with reference to FIG. 7.

In step S602, the application 102 determines whether the push notification information is valid before the expiration date. If the determination is YES in step S602 (YES in step S602), the processing proceeds to step S603. If the determination is NO in step S602 (NO in step S602), the processing proceeds to step S611. In step S611, the application 102 deletes the push notification information, and the processing ends.

In step S603, the application 102 transmits an acquisition request to acquire status information regarding the printer 200. The "status information" refers to information indicating in what state the printer 200 is as illustrated in FIG. 8. For example, if the printer 200 is performing printing, the value of "Printing" is returned from the printer 200. The status information also includes detailed status information. The detailed status information includes, for example, error/warning information. The "error/warning information" refers to information indicating an error or a warning occurring in the printer 200 as illustrated in FIG. 8. For example, if the remaining amount of ink is small, the value of "InkLow" is returned from the printer 200. Thus, if the printer 200 is performing printing and the remaining amount of ink is small, the value of "Printing:InkLow" is returned as the status information from the printer 200. There is also a case where the status information does not include the error/warning information as the detailed status information. For example, if the printer 200 is performing printing and the error/warning information is not present as the detailed status information, the value of "Printing" alone is returned as the status information from the printer 200.

In step S604, the application 102 determines whether the acquisition of the status information is successful. If the determination is YES in step S604 (YES in step S604), the processing proceeds to step S605. If the determination is NO in step S604 (NO in step S604), the processing proceeds to step S606.

Figure 10:
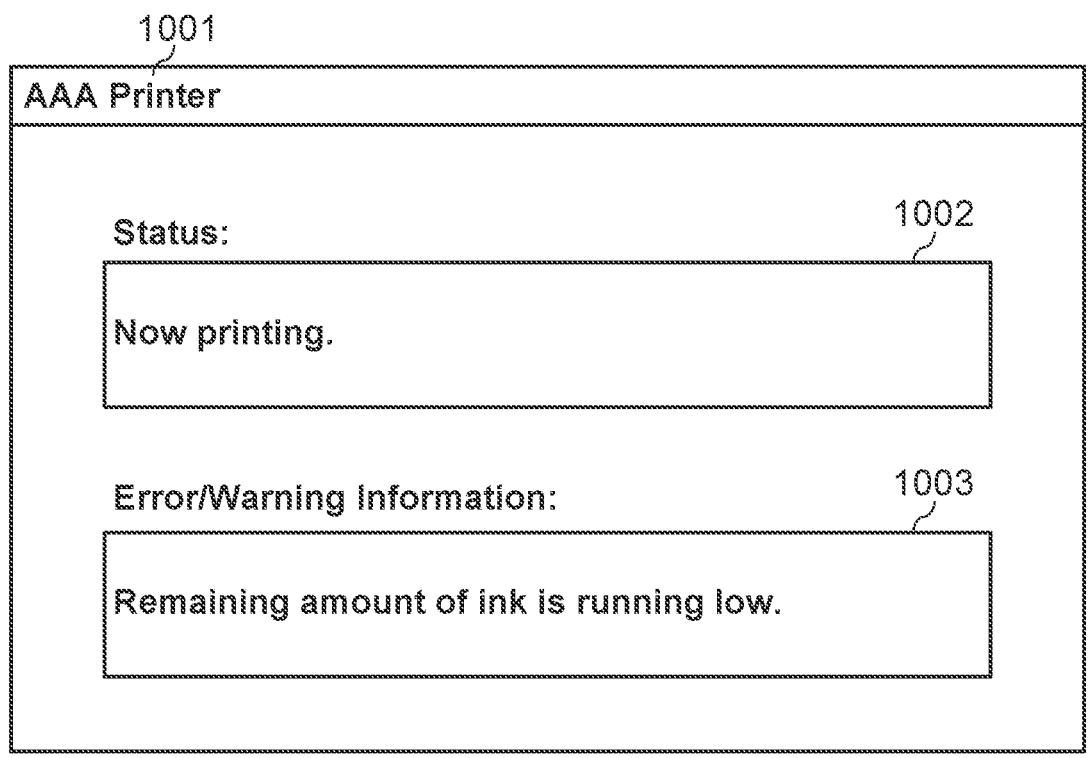
FIG. 10 illustrates a screen displayed in a case where the status information and the error/warning information regarding the printer are acquired according to one embodiment.

In step S605, the application 102 saves the status information acquired from the printer 200 into the storage unit 120. The application 102 may also display the status information acquired from the printer 200 on the display unit 150 of the terminal apparatus 100. Specifically, as illustrated in FIG. 10, the application 102 may display a message indicating the status of the printer 200 and a message indicating the error/warning information.

In step S606, the application 102 carries out the process of determining the display of the notification based on the push notification information, thereby determining whether to display the push notification information on the screen of the terminal apparatus 100. The process of determining the display of the push notification information will be described below with reference to FIG. 9.

In step S607, the application 102 reads the result of the display determination process saved in the storage unit 120 in step S606 and determines whether to "display" or "not display" the push notification. Specifically, the application 102 determines whether information indicating that the application 102 is to "display" the push notification is acquired or information indicating that the application 102 is to "not display" the push notification is acquired. If the information indicating that the application 102 is to "display" the push notification is acquired, the determination is YES in step S607 (YES in step S607), and the processing proceeds to step S608. If the information indicating that the application 102 is to "not display" the push notification is acquired, the determination is NO in step S607 (NO in step S607), and the processing proceeds to step S609.

In step S608, the application 102 displays the notification based on the push notification information on (outputs the notification based on the push notification information to) the screen of the terminal apparatus 100. Specifically, the application 102 instructs the OS 101 to display the notification based on the push notification information on the screen of the terminal apparatus 100. Consequently, the OS 101 displays the notification based on the push notification information via the display unit 150. As the notification method, a notification function of the OS 101 may be used as in a toast notification.

In some embodiments, the application 102 displays the notification based on the push notification information. IN other embodiments, the push notification is output with sound via the sound output unit 130. That is, the application 102 may notify the user of the content of the campaign with sound. Then, in step S611, the application 102 deletes the push notification information, and the processing ends.

If the determination is NO in step S607 (NO in step S607), then in step S609, the application 102 starts a timer. This process is carried out because if a predetermined time specified in advance elapses, the state of the printer 200 can have changed, causing the status information regarding the printer 200 to satisfy a display condition for the push notification information.

In step S610, the application 102 determines whether a predetermined time specified in advance elapses. If the determination is YES in step S610 (YES in step S610), the processing returns to step S601. In step S601, the application 102 carries out the process of displaying the notification based on the push notification information again. If the determination is NO in step S610 (NO in step S610), the process of step S610 is repeated.

FIG. 7 illustrates a flowchart of the process of determining the expiration date of the notification based on the push notification information that is performed in step S601.

In step S701, the application 102 reads the push notification information saved in the storage unit 120.

In step S702, the application 102 determines whether the expiration date of the push notification information is specified. Specifically, the application 102 determines whether "expireDate" is described in the push notification information. If "expireDate" is described, it is determined that the expiration date of the notification is specified. If the determination is YES in step S702 (YES in step S702), the processing proceeds to step S703. If the determination is NO in step S702 (NO in step S702), the processing proceeds to step S706. In step S706, the application 102 determines that the push notification information is valid before the expiration date. Then, the application 102 saves the determination as the result of the process of determining the expiration date of the notification based on the push notification information in the storage unit 120, and the processing ends.

In step S703, the application 102 makes an acquisition request to acquire date and time information to the OS 101 and acquires the current date and time.

In step S704, the application 102 determines whether the push notification information is valid before the expiration date. Specifically, the application 102 determines whether the current date and time is before the expiration date described in the push notification information. If the determination is YES in step S704 (YES in step S704), the processing proceeds to step S706. In step S706, the application 102 determines that the push notification information is valid before the expiration date. Then, the application 102 saves the determination as the result of the process of determining the expiration date in the storage unit 120, and the processing ends. If the determination is NO in step S704 (NO in step S704), the processing proceeds to step S705. In step S705, the application 102 determines that the push notification information is past the expiration date. Then, the application 102 saves the determination as the result of the process of determining the expiration date of the notification based on the push notification information in the storage unit 120, and the processing ends. Then, the processing proceeds to step S602 in FIG. 6.

FIG. 9 illustrates a flowchart of the process of determining the display of the notification based on the push notification information that is performed in step S606.

In step S901, the application 102 reads the push notification information saved in the storage unit 120.

In step S902, the application 102 determines whether a display condition is specified for the push notification information. Specifically, the application 102 confirms whether "condition" is described in the push notification information. If "condition" is described, the application 102 determines that a display condition for the notification is specified. If the determination is YES in step S902 (YES in step S902), the processing proceeds to step S903. If the determination is NO in step S902 (NO in step S902), the processing proceeds to step S906.

In step S906, the application 102 determines that the application 102 is to "display" the push notification information. That "condition" is not described in the push notification information means that the application 102 is to display the push notification information regardless of the status of the printer 200. The application 102 saves information indicating that the application 102 is to "display" the push notification information that is the determination result, as the result of the process of determining the display of the push notification information in the storage unit 120, and the processing ends.

In step S902, if it is determined that a display condition is specified for the push notification information (YES in step S902), then in step S903, the application 102 determines whether the status information acquired from the printer 200 is saved in the storage unit 120. Specifically, if the acquisition of the status information from the printer 200 is successful in step S604 and the status information is saved in the storage unit 120 in step S605 in FIG. 6, it is determined that the status information is saved in the storage unit 120. If the determination is YES in step S903 (YES in step S903), the processing proceeds to step S904. If the determination is NO in step S903 (NO in step S903), the processing proceeds to step S907. In step S907, since the status information regarding the printer 200 is not saved in the storage unit 120, the application 102 cannot determine whether the status information regarding the printer 200 satisfies the display condition for the push notification information. Thus, the application 102 determines that the application 102 is to not display the push notification information. Then, the application 102 saves information indicating that the application 102 is to "not display" the push notification information, as the result of the process of determining the display of the notification based on the push notification information in the storage unit 120, and the processing ends.

If it is determined in step S903 that the status information is saved in the storage unit 120 (YES in step S903), then in step S904, the application 102 reads the status information regarding the printer 200 saved in the storage unit 120.

In step S905, the application 102 determines whether the status information regarding the printer 200 satisfies the display (output) condition for the push notification information. Specifically, the application 102 determines whether the status information regarding the printer 200 read from the storage unit 120 matches the content described in "condition" in the push notification information. For example, in FIG. 5, "InkLow" is described in "condition" in the push notification information. Thus, if "InkLow" is included as the error/warning information in the detailed status information in the status information regarding the printer 200 read from the storage unit 120, it is determined that the display condition for the push notification information is satisfied. That is, for example, if the value of the status information regarding the printer 200 illustrated in FIG. 8 is "Idle:InkLow" or "Printing:InkLow", it is determined that the display condition for the push notification information is satisfied. If the determination is YES in step S905 (YES in step S905), the processing proceeds to step S906. If the determination is NO in step S905 (NO in step S905), the processing proceeds to step S907. In step S906, the application 102 saves information indicating that the application 102 is to "display" the push notification information, as the result of the process of determining the display of the push notification information in the storage unit 120, and the processing ends. In step S907, the application 102 saves information indicating that the application 102 is to "not display" the push notification information, as the result of the process of determining the display of the notification based on the push notification information in the storage unit 120, and the processing ends. Then, the processing proceeds to step S607 in FIG. 6.

As described above, in the present example embodiment, a display condition is specified for push notification information provided by the management server 400. If the state of a communication apparatus such as the printer 200 connected to the terminal apparatus 100 satisfies the display condition, the application 102 displays a push notification on the screen of the terminal apparatus 100. Consequently, the push notification is displayed at the timing when the user would wish the push notification.

In the present example embodiment, the determination of whether a display condition is specified for the push notification information is made in the display determination process. The present invention, however, is not limited to that. For example, a form may be employed in which, before the application 102 carries out the process of saving the push notification information in the storage unit 120 in step S110 in FIG. 3, the application 102 determines whether a display condition is specified for the push notification information. Then, the application 102 saves in the storage unit 120 the push notification information for which a display condition is specified. The application 102 immediately displays on the screen of the terminal apparatus 100 the push notification based on the push notification information for which a display condition is not specified. Specifically, before step S110 is carried out, the application 102 may make a determination similar to that in step S902 in FIG. 9. Then, if the determination is NO in step S902, the application 102 may immediately display the push notification on the screen of the terminal apparatus 100. If the determination is YES in step S902, the application 102 may save the push notification information in the storage unit 120.

In the present example embodiment, the application 102 has been described as an application for controlling the printer 200. More specifically, the application 102 may be a printing workflow application described below in a second example embodiment, or may be an application for notification. Further, a form may be employed in which the function of the application 102 is carried out by two application programs. In the case of the form in which the function of the application 102 is carried out by two application programs, a form may be employed in which a first application performs the processing up to step S110 in FIG. 3 in which the application 102 saves the push notification information in the storage unit 120. Then, a second application performs the process of displaying the notification based on the push notification information in FIG. 6. Alternatively, another form may be employed. Examples of the first application include an application for managing various pieces of information regarding the printer 200 and presenting the various pieces of information to the user. Examples of the second application include a notification application for notifying the user of the status of the printer 200.

In the form in which the application 102 immediately displays on the screen of the terminal apparatus 100 the notification based on the push notification information for which a display condition is not specified, the first application may display the notification, or the first application may give a display instruction to the second application. Then, the second application may cause the OS 101 to display the notification. Thus, also in the form in which two applications cause the application 102 to operate, it is possible to obtain an effect similar to that of the form in which a single application causes the application 102 to operate.

A second example embodiment will be described. In the first example embodiment, the process of displaying the notification based on the push notification information is carried out based on the fact that the application 102 saves the push notification information acquired from the push notification server 300 in the storage unit 120. Further, if the status information regarding the printer 200 does not satisfy the display condition specified for the push notification information, the application 102 starts the timer. Then, after the predetermined time lapses, the application 102 carries out the process of displaying the notification based on the push notification information again, resulting in carrying out the process at regular intervals.

However, if the status information regarding the printer 200 does not satisfy the display condition specified for the push notification information, the application 102 continues to carry out the process of displaying the notification based on the push notification information at regular intervals. Thus, the processing load of the CPU 110 may increase. Further, the processing in step S601 and the subsequent steps is not performed again until the predetermined time elapses in the timer. Thus, the printer 200 may finish printing while the predetermined time elapses. That is, if the display condition specified for the push notification information is that the status of the printer 200 is "printing", and a printing timing comes before the predetermined time elapses in step S610, the user may miss the display of the push notification. In response, in the present example embodiment, a form will be described in which the user misses the display of the push notification as little as possible with a reduced processing load of the CPU 110.

In response, in the present example embodiment, a form will be described in which the application 102 is started based on a print instruction from the user and carries out the process of displaying the notification based on the push notification information. In the present example embodiment, a case will be described where an extension application termed a printing workflow application of Windows® is used as the application 102. The printing workflow application starts and operates based on a print instruction from the user and thereby can extend the functions of the printer driver (e.g., print settings and a preview function). Further, in the present example embodiment, a case will be used where the printing workflow application starts according to a print instruction from the user and displays the status information and the error/warning information regarding the printer 200, as a function provided by the printing workflow application, for example. In the present example embodiment, the processing up to step S110 in FIG. 3 in which the application 102 saves the push notification information in the terminal apparatus 100 is similar to that in the first example embodiment, which will not be described. The differences from the first example embodiment will be mainly described.

FIG. 10 illustrates a screen displayed on the display unit 150 of the terminal apparatus 100 in a case where the printing workflow application acquires the status information and the error/warning information regarding the printer 200. In an area 1001, the model name of the printer 200 is displayed. As an example, "AAA Printer" is displayed. In an area 1002, the status information acquired from the printer 200 is displayed. As an example, "Now printing." is displayed. This means that the value of "Printing" illustrated in FIG. 8 is returned as the status information from the printer 200. If the error/warning information is present as the detailed status information included in the status information acquired from the printer 200, the error/warning information is displayed in an area 1003. As an example, "Remaining amount of ink is running low." is displayed. This means that "InkLow" illustrated in FIG. 8 is returned as the error/warning information from the printer 200. That is, the content illustrated in FIG. 10 is displayed on the screen of the terminal apparatus 100 means that "Printing:InkLow" is returned as the value illustrated in FIG. 8 from the printer 200. If the error/warning information is not present as the detailed status information included in the status information acquired from the printer 200, the area 1003 may be blank, or information indicating that the error/warning information is not present may be displayed in the area 1003.

Figure 11:
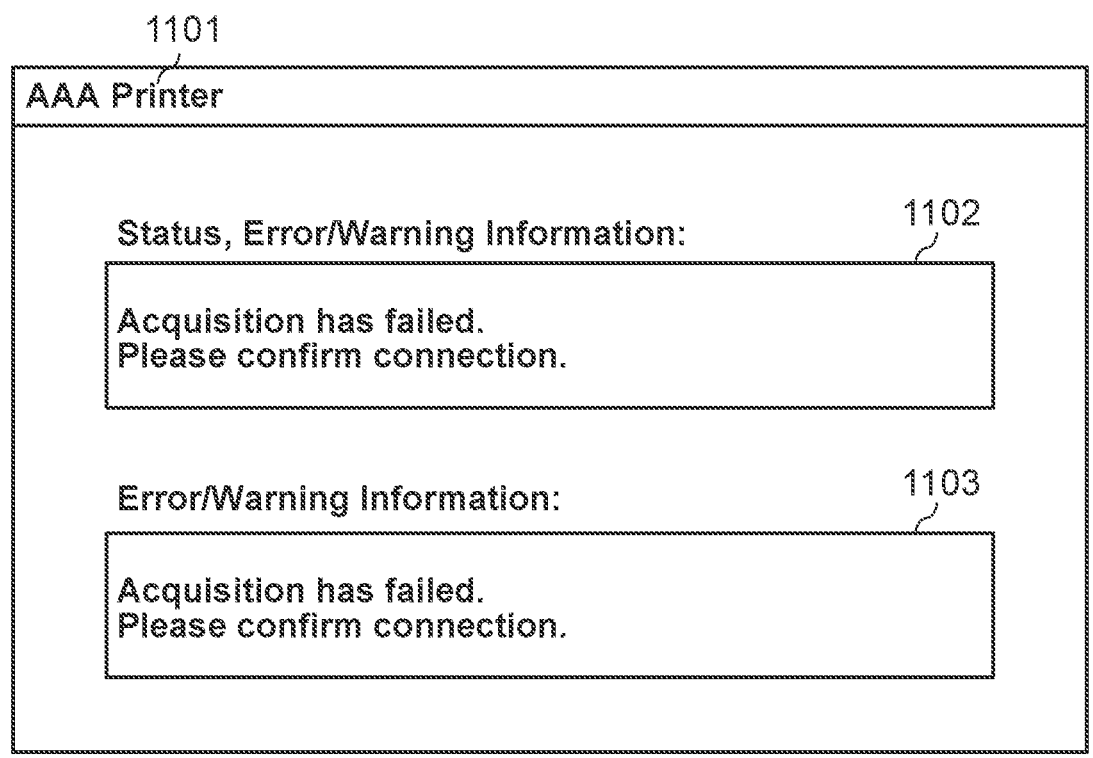
FIG. 11 illustrates a screen displayed in a case where the acquisition of the status information and the error/warning information regarding the printer fails according to one embodiment.

FIG. 11 illustrates a screen displayed in a case where the printing workflow application fails in acquiring the status information and the error/warning information regarding the printer 200. For example, information indicating that the acquisition of the status information regarding the printer 200 fails is displayed in an area 1102, and information indicating that the acquisition of the error/warning information fails is displayed in an area 1103. As an example, "Acquisition has failed. Please confirm connection."

Figure 12:
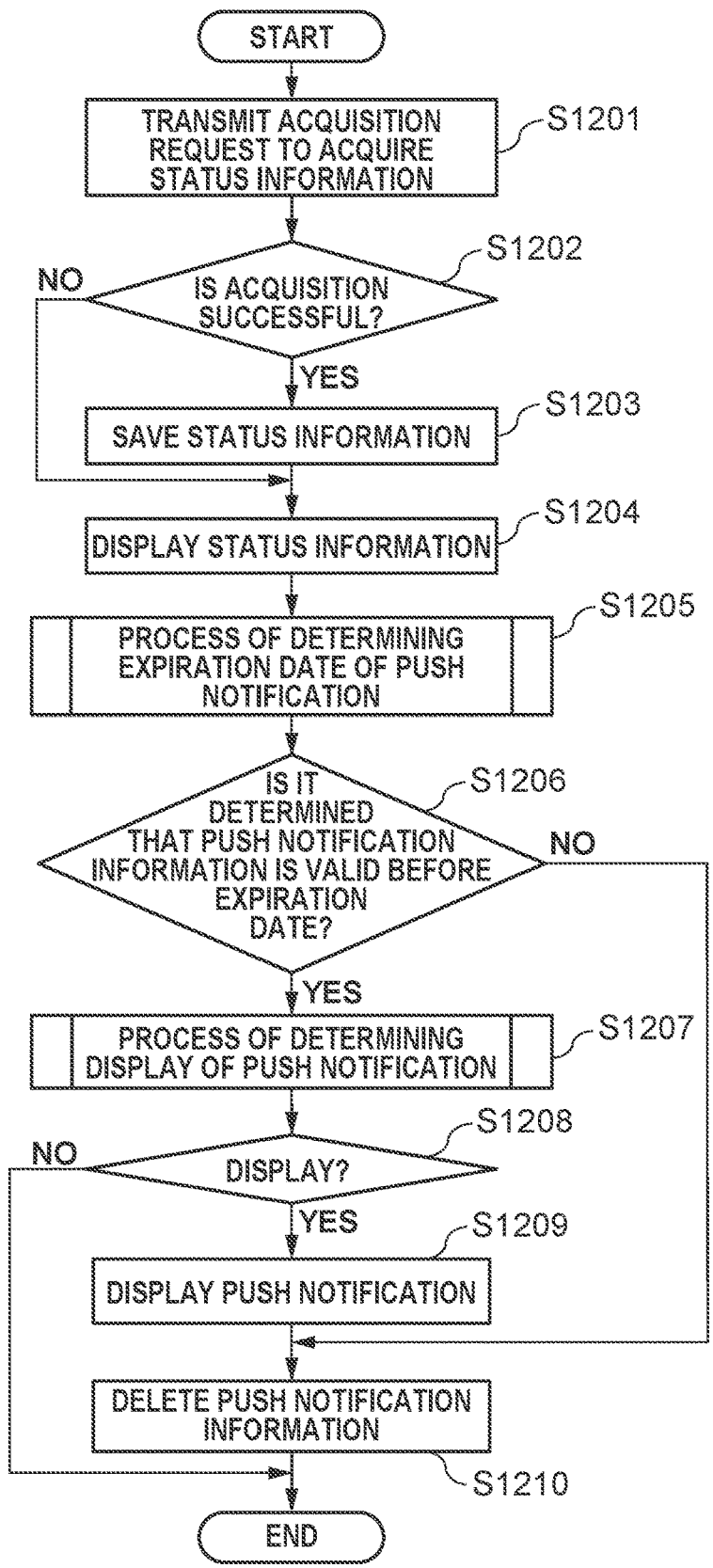
FIG. 12 illustrates a flowchart of processing of a printing workflow application according to one embodiment.

FIG. 12 is a flowchart of the processing of the printing workflow application. In the following description, the printing workflow application as the application 102 may perform each process, but actually, a corresponding function is carried out by a processor such as the CPU 110 in the terminal apparatus 100 running a corresponding program.

Not all the processing is sequentially performed in a single process, and there can also be a case where the processing is transferred to the OS once and called by the OS again. This is a mere procedure simply illustrating the main processing for convenience.

The flowchart in FIG. 12 starts by the printing workflow application being started based on a print instruction. The print instruction is issued if the user gives an instruction to start printing on a print setting screen provided by a drawing application or a print setting screen provided by the OS 101. Then, the printing workflow application starts.

The processes of steps S1201 to S1203 are similar to those of steps S603 to S605, which will not be described.

In step S1204, the printing workflow application displays the status information acquired from the printer 200 on the display unit 150 of the terminal apparatus 100. If the error/warning information is present as the detailed status information included in the status information, the error/warning information may be displayed together with the status information. That is, if it is determined in step S1202 that the acquisition of the status information is successful (YES in step S1202), the acquired status information and error/warning information are displayed in the areas 1002 and 1003, respectively, in FIG. 10. If it is determined in step S1202 that the acquisition of the status information is not successful (NO in step S1202), then as illustrated in FIG. 11, information indicating that the acquisition fails is displayed in the areas 1102 and 1103 in FIG. 11.

The processes of steps S1205 to S1210 are similar to those of steps S602, S603, S606, S607, S608, and S611, respectively, which will not be described.

If the printing workflow application acquires information indicating that the printing workflow application is to "not display" the notification based on the push notification information in step S1208 (NO in step S1208), the processing ends.

As described above, in the present example embodiment, the printing workflow application is started based on a print instruction and carries out the process of displaying the notification based on the push notification information. Consequently, the display process is carried out at an appropriate timing that is while printing is being performed. Thus, the configuration allows reduction of an increase in the processing load of the CPU 110. Displaying a push notification at a timing based on a print instruction eliminates the need for providing a timer, making it less likely for the user to miss the push notification.

Although the present example embodiment has been described using the processing of the printing workflow application as an example, another application that starts when printing is performed may carry out similar processing.

In the present example embodiment, a form may be employed in which the function of the application 102 is carried out by two application programs. In the case of the form in which the function of the application 102 is carried out by two application programs, a form may be employed in which a first application carries out the processing up to step S110 in FIG. 3 in which the application 102 saves the push notification information in the storage unit 120, and then a second application carries out the process of displaying the notification based on the push notification information in FIG. 12. Alternatively, another form may be employed. In the case of the form in which the application 102 immediately displays on the screen of the terminal apparatus 100 the notification based on the push notification information for which a display condition is not specified, the first application may display the notification, or the first application may instruct the second application to display the notification. Thus, also in the form in which two applications cause the application 102 to operate, it is possible to obtain an effect similar to that of the form in which a single application causes the application 102 to operate.

A third example embodiment will be described. In the first and second example embodiments, a case has been described where a single push notification is saved in the storage unit 120 of the terminal apparatus 100. However, if another piece of push notification information is transmitted from the management server 400 before saved push notification information is deleted, this results in saving a plurality of pieces of push notification information in the storage unit 120. In the present example embodiment, a form will be described in which also for a plurality of pieces of push notification information to be saved, a notification based on a piece of push notification information is displayed at a timing when the user wishes the notification. The differences from the first and second example embodiments will be mainly described.

FIGS. 13A and 13B are tables illustrating pieces of push notification information saved in the storage unit 120 by the application 102. As an example, four pieces of push notification information, namely push notification information_1 to push notification information_4, are saved. "No." indicates the processing order of the pieces of push notification information to be processed. The example of FIG. 13A indicates that the push notification information_1 is to be processed first, and the push notification information_4 is to be processed last. "Distribution date" indicates the date and time when each piece of push notification information is saved in the storage unit 120. For example, it is indicated that the push notification information_1 is saved in the storage unit 120 by the application 102 at "Oct. 1, 2020, 10:00". When saving the pieces of push notification information in the storage unit 120, the application 102 sets "distribution date" for each piece of push notification information. The example of FIG. 13A indicates that the application 102 saves the pieces of push notification information so that the pieces of push notification information are processed in chronological order of distribution date. "Notification priority" in FIG. 13B indicates the priority of each piece of push notification information set by the service provider such as a vendor on the dashboard provided by the management server 400.

FIG. 14 is an example of the dashboard where the priority of each piece of push notification information can be set. A setting item 1401 is an item for setting the priority of a piece of push notification information. As an example, "high" is set as the priority by the service provider. Priorities such as "medium" and "low" are also provided, and another priority may be provided. The example of FIG. 13B indicates that the application 102 saves the pieces of push notification information so that the pieces of push notification information are processed in descending order of priority and in chronological order of distribution date If expiration dates are specified for the pieces of push notification information, a form may be employed in which the pieces of push notification information are saved so that the pieces of push notification information are processed not in chronological order of distribution date, but in chronological order of expiration date.

Figure 15:
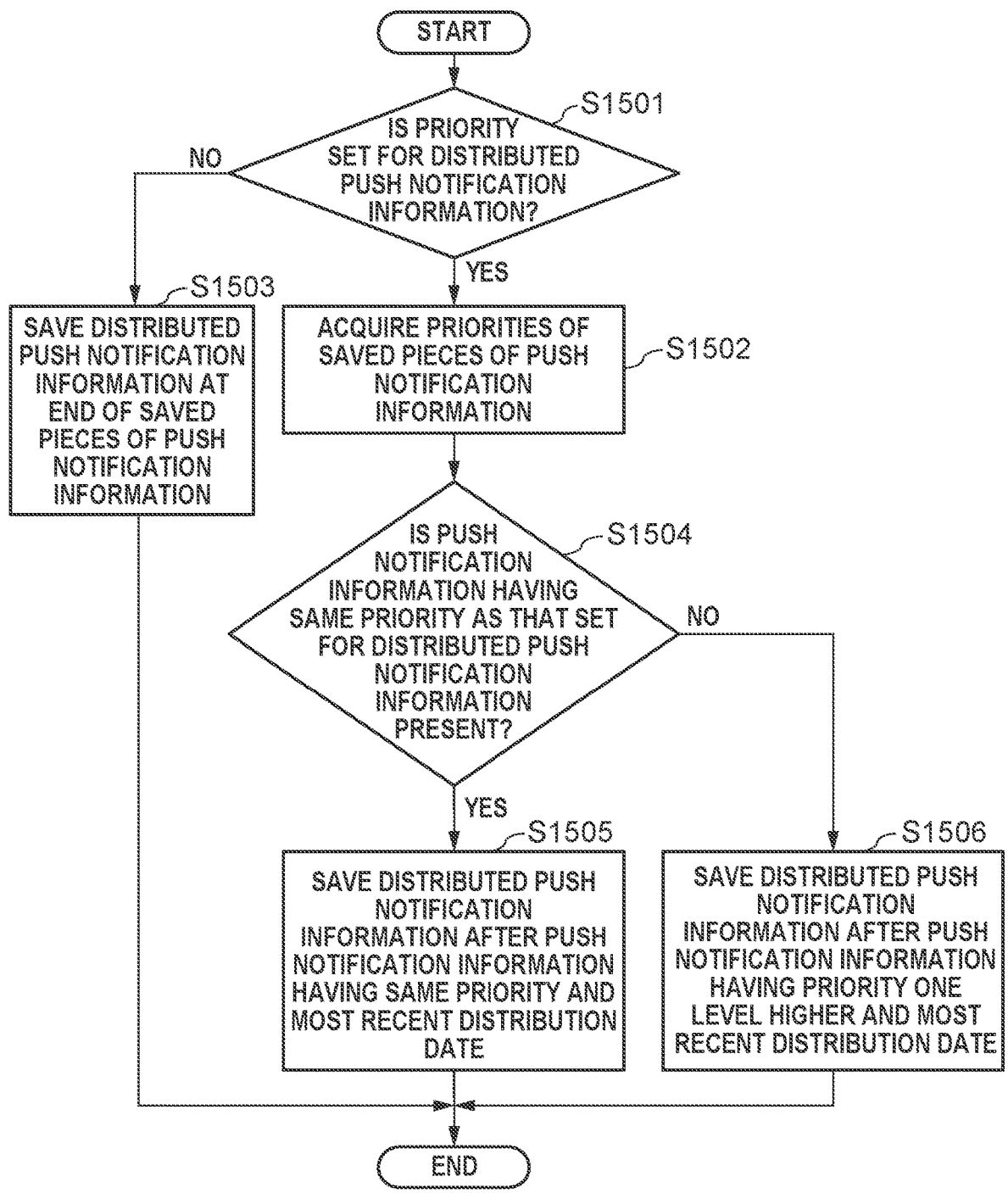
FIG. 15 is a flowchart for specifying an order of pieces of push notification information to be saved according to one embodiment.

FIG. 15 illustrates a flowchart of the process in which the application 102 specifies the order of pieces of push notification information to be saved in the storage unit 120. In the following description, the application 102 may perform each process, but actually, a corresponding function is carried out by a processor such as the CPU 110 in the terminal apparatus 100 running a corresponding program. Not all the processing is sequentially performed in a single process, and there can also be a case where the processing is transferred to the OS once and called by the OS again. This is a mere procedure simply illustrating the main processing for convenience.

The flowchart in FIG. 15 starts by the push notification information being passed from the OS 101 in step S109 in FIG. 3.

In step S1501, the application 102 determines whether a priority is set for the push notification information distributed from the push notification server 300. Specifically, for example, the application 102 determines whether "priority" is described in the push notification information. If the determination is YES in step S1501 (YES in step S1501), the processing proceeds to step S1502. If the determination is NO in step S1501 (NO in step S1501), the processing proceeds to step S1503. In step S1503, if a priority is not set for the push notification information, the push notification information is saved in the storage unit 120 so that the push notification information is processed last in the processing order. For example, if a piece of push notification information to be processed last among pieces of push notification information saved in the storage unit 120 is "No. 3", the distributed push notification information is saved as "No. 4". Then, the processing ends.

In step S1502, the application 102 acquires the priorities of the pieces of push notification information saved in the storage unit 120.

In step S1504, the application 102 determines whether a piece of push notification information having the same priority as the priority set for the distributed push notification information is present among the pieces of push notification information saved in the storage unit 120. Specifically, for example, if "high" is described in "priority" in the distributed push notification information, the application 102 determines whether "high" is described in "priority" in any of the saved pieces of push notification information. If the determination is YES in step S1504 (YES in step S1504), the processing proceeds to step S1505. If the determination is NO in step S1504 (NO in step S1504), the processing proceeds to step S1506.

In step S1505, the application 102 saves the distributed push notification information in the storage unit 120 so that the distributed push notification information is processed after the piece of push notification information having the same priority as that of the distributed push notification information and the most recent distribution date among the saved pieces of push notification information. For example, if the piece of push notification information having the same priority as that of the distributed push notification information and the most recent distribution date among the pieces of push notification information saved in the storage unit 120 is "No. 3", the distributed push notification information is saved as "No. 4". Then, the processing ends.

In step S1506, the application 102 saves the distributed push notification information in the storage unit 120 so that the distributed push notification information is processed after a piece of push notification information having a priority one level higher than that of the distributed push notification information and the most recent distribution date among the saved pieces of push notification information. For example, if the piece of push notification information having a priority one level higher than that of the distributed push notification information and the most recent distribution date among the pieces of push notification information saved in the storage unit 120 is "No. 3", the distributed push notification information is saved as "No. 4". Then, the processing ends.

FIGS. 16A and 16B illustrate a flowchart of the process of displaying the notification based on the push notification information that is performed by the application 102 in a case where a plurality of pieces of push notification information is saved in the configuration of the first example embodiment. In the following description, the application 102 may perform each process, but actually, a corresponding function is carried out by a processor such as the CPU 110 in the terminal apparatus 100 running a corresponding program. Not all the processing is sequentially performed in a single process, and there can also be a case where the processing is transferred to the OS once and called by the OS again. This is a mere procedure simply illustrating the main processing for convenience.

Similarly to FIG. 6, the flowchart in FIGS. 16A and 16B starts by the push notification information being saved in the storage unit 120 in step S110 in FIG. 3.

In step S1601, the application 102 determines a push notification as a processing target according to a position in the processing order indicated by "No." from among the pieces of push notification information illustrated in FIGS. 13A and 13B and saved in the storage unit 120.

The processes of steps S1602 to S1612 are similar to those of steps S601 to S611 in FIG. 6, which will not be described.

In step S1613, the application 102 determines whether there is push notification information saved in the storage unit 120. If the determination is YES in step S1613 (YES in step S1613), the processing proceeds to step S1610. If the determination is NO in step S1613 (NO in step S1613), the processing ends. In step S1610, the application 102 starts the timer. If it is determined in step S1611 that the predetermined time elapses (YES in step S1611), the processing returns to step S1601. In step S1601, the application 102 determines a push notification as a processing target according to a position in the processing order indicated by "No." again and carries out the processing. Consequently, the application 102 repeats the display process on all the pieces of push notification information saved in the storage unit 120.

Figures 17, 17A:
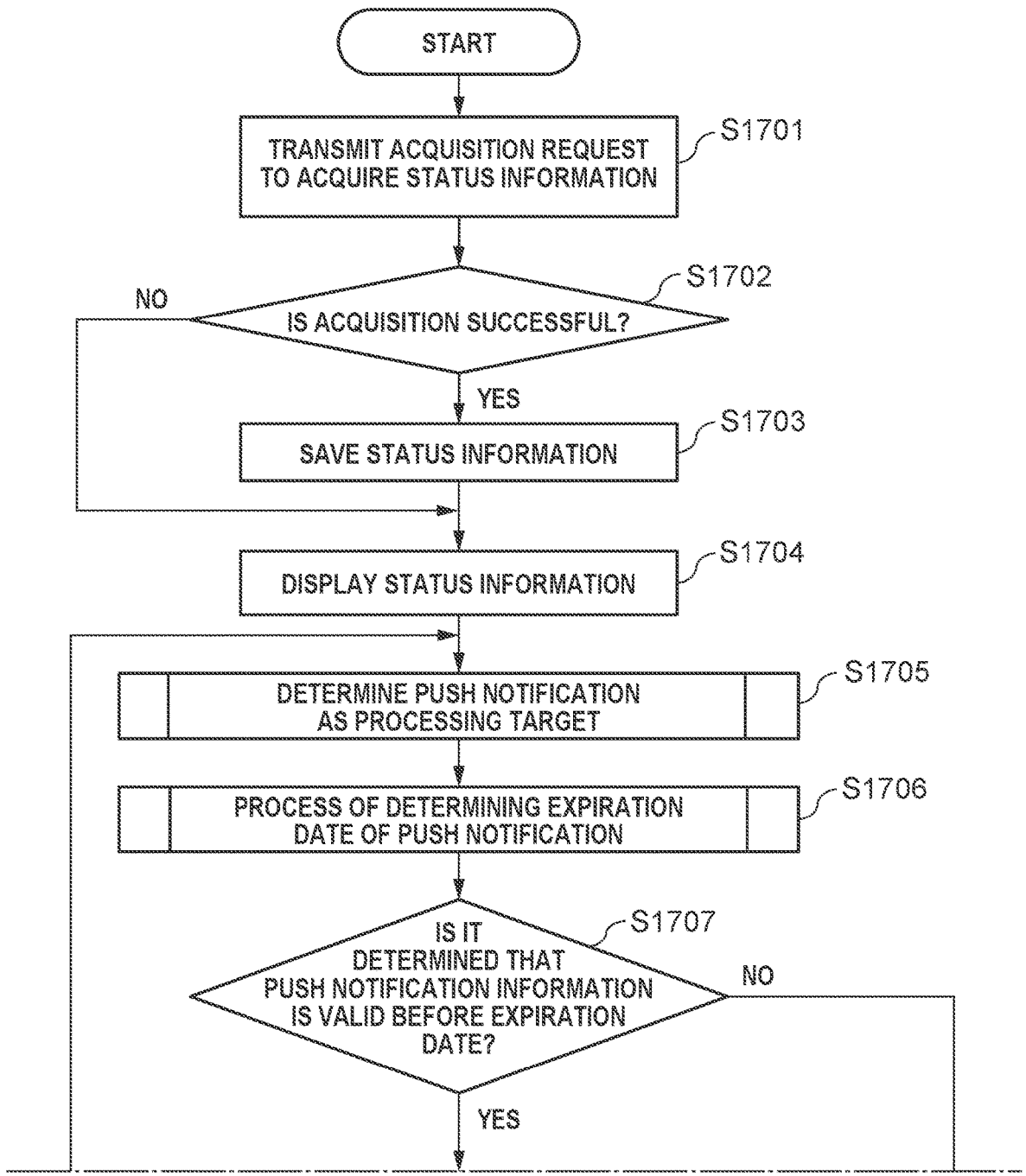
FIGS. 17A and 17B are a flowchart illustrating a process of displaying the notification based on the push notification information according to one embodiment.
Figure 17B:
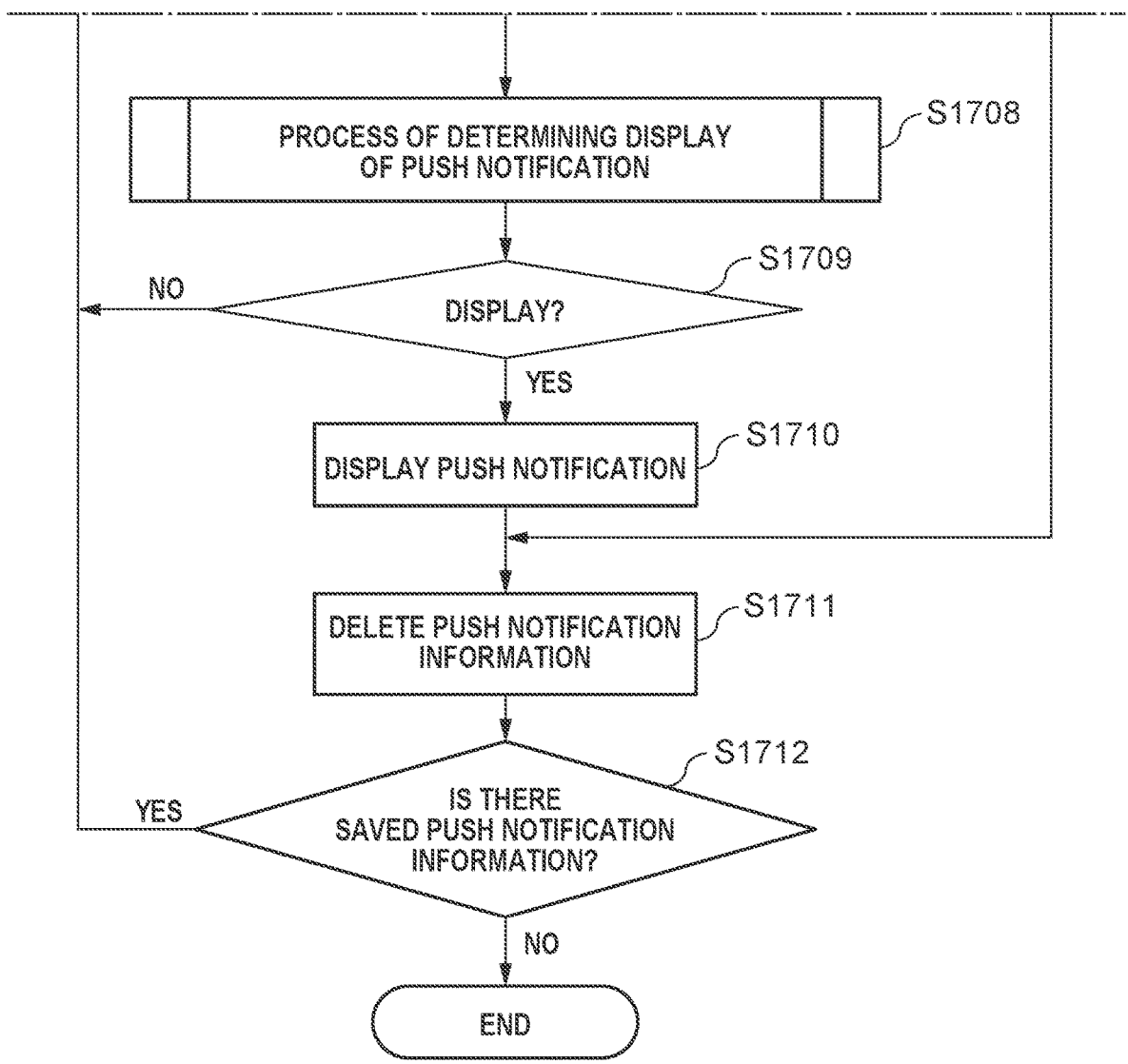

FIGS. 17A and 17B illustrate a flowchart of the process of displaying the notification based on the push notification information that is performed by the application 102 in a case where a plurality of pieces of push notification information is saved in the configuration of the second example embodiment.

Similarly to FIG. 12, the flowchart in FIGS. 17A and 17B starts by the printing workflow application being started based on a print instruction. The print instruction is issued if the user gives an instruction to start printing on the print setting screen provided by the drawing application or the print setting screen provided by the OS 101. Then, the printing workflow application starts.

The processes of steps S1701 to S1704 are similar to those of steps S1201 to S1204 in FIG. 12, which will not be described.

In step S1705, the printing workflow application determines a push notification as a processing target according to a position in the processing order indicated by "No." from among the pieces of push notification information illustrated in FIGS. 13A and 13B and saved in the storage unit 120.

The processes of steps S1706 to S1711 are similar to those of steps S1205 to S1210 in FIG. 12, which will not be described.

In step S1712, the printing workflow application determines whether there is push notification information saved in the storage unit 120. If the determination is YES in step S1712 (YES in step S1712), the processing returns to step S1705. If the determination is NO in step S1712 (NO in step S1712), the processing ends. In step S1705, the printing workflow application determines a push notification as a processing target according to a position in the processing order indicated by "No." again and carries out the processing.

Consequently, the printing workflow application repeats the display process on all the pieces of push notification information saved in the storage unit 120.

As described above, in the present example embodiment, also in a case where a plurality of pieces of push notification information is saved, a distributed push notification is displayed at the timing when the user would wish the push notification. The priority of a notification is set in the setting item 1401 illustrated in FIG. 14, whereby a push notification that the service provider such as a vendor wishes to preferentially display can also be preferentially displayed.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-104934, filed Jun. 24, 2021, which is hereby incorporated by reference herein in its entirety.

What is claimed is:

1. A method for controlling an information processing apparatus, the method comprising:
receiving status information regarding communication apparatus that communicates with the information processing apparatus;
receiving notification information transmitted by a management server that communicates with the information processing apparatus;

executing a first determination process for determining whether the received status information satisfies an output condition included in the received notification information; and in a case where it is determined in the first determination process that the status information regarding the communication apparatus satisfies the output condition, outputting a notification based on the notification information, wherein the notification is not output in a case where the received status information does not satisfy the output condition.

2. The method according to claim 1, further comprising:
executing a second determination process for determining whether the output condition is specified for the notification information, and in a case where it is determined that in the second determination process the output condition is specified for the notification information, executing the first determination process.

3. The method according to claim 2, wherein in a case where it is determined in the second determination process that the output condition is not specified for the notification information, the first determination process is not executed, and the notification based on the notification information is output.

4. The method according to claim 1, wherein the received notification information is notification information transmitted from the management server and saved in a storage device of the information processing apparatus.

5. The method according to claim 1, the method further comprising:
in a case where it is determined based on a validity period that the notification information is valid, causing a computer of the information processing apparatus to execute the first determination process.

6. The method according to claim 5, wherein in a case where it is determined based on the validity period that the notification information is invalid, the notification based on the notification information is not output, and the notification information is deleted.

7. The method according to claim 1, wherein after the notification based on the notification information is output, the notification information is deleted.

8. The method according to claim 1, wherein the status information regarding a communication apparatus is acquired based on a print instruction to the communication apparatus.

9. The method according to claim 1, further comprising outputting the information regarding the communication apparatus before the first determination process is executed.

10. The method according to claim 1, wherein in a case where it is not determined in the first determination process that the information regarding the communication apparatus satisfies the output condition, the program further causes a computer of the information processing apparatus to execute a process of determining whether a predetermined time has elapsed, and in a case where it is determined that the predetermined time has elapsed, the information regarding the communication apparatus is newly acquired.

11. The method according to claim 4, further comprising, in a case where a plurality of the pieces of notification information is received, identifying a piece of notification information having a high priority among the plurality of the pieces of notification information, and saving the plurality of the pieces of notification information in the storage unit so that a computer of the information processing apparatus executes the first determination process on the pieces of notification information in descending order of priority.

12. The method according to claim 1, wherein in tea case where it is determined in the first determination process that the information regarding the communication apparatus satisfies the output condition, an operating system is caused to output the notification based on the notification information.

13. The method according to claim 1, wherein the notification is output through display on a screen of the information processing apparatus.

14. The method according to claim 1, wherein the notification is output with sound.

15. A system including a server system, an information processing apparatus, and a communication apparatus configured to communicate with the information processing apparatus,
the server system comprising:
a controller configured to:
create notification information for which an output condition is specified; and
transmit the created notification information, and
the information processing apparatus comprising: a controller configured to:
receive status information regarding the communication apparatus;
receive the transmitted notification information;
execute a first determination process for determining whether the received status information satisfies an output condition included in the received notification information; and
in a case where it is determined that in the first determination process the status information regarding the communication apparatus satisfies the output condition, output a notification based on the notification information, wherein the notification is not output in a case where the received status information does not satisfy the output condition.

16. A non-transitory storage medium that stores a program for causing a computer of an information processing apparatus to execute a process comprising:
receiving status information regarding a communication apparatus that communicates with the information processing apparatus;
receiving notification information transmitted by a management server that communicates with the information processing apparatus;
executing a first determination process for determining whether the received status information satisfies an output condition included in the received notification information; and
in a case where it is determined in the first determination process that the status information regarding the communication apparatus satisfies the output condition, outputting a notification based on the notification information, wherein the notification is not output in a case where the received status information does not satisfy the output condition.

* * * * *